United States Patent [19]

Citrone et al.

[11] 4,151,138
[45] Apr. 24, 1979

[54] COATING COMPOSITIONS

[75] Inventors: Anthony M. Citrone, Chinnor; Richard W. Avery, High Wycombe, both of England

[73] Assignee: Reckitt & Colman Products Ltd., London, England

[21] Appl. No.: 775,666

[22] Filed: Mar. 8, 1977

[51] Int. Cl.$^2$ ............................................. C08L 91/00
[52] U.S. Cl. .......................... 260/28.5 AV; 260/27 R; 260/28.5 A; 260/29.6 PT; 260/897 B; 427/221; 427/355; 428/403
[58] Field of Search .................. 427/221; 428/403; 260/29.6 PT, 28.5 A, 28.5 AV, 897 B, 27 R

[56] References Cited

U.S. PATENT DOCUMENTS

| | | | |
|---|---|---|---|
| 2,766,157 | 10/1956 | Peterson | 260/28.5 A |
| 2,964,487 | 12/1960 | Chapman | 260/28.5 A |
| 3,234,158 | 2/1966 | Pfluger et al. | 260/28.5 A |
| 3,326,848 | 6/1967 | Clemens et al. | 260/29.2 M |
| 3,328,325 | 6/1967 | Zdanowski | 260/27 R |
| 3,409,578 | 11/1968 | Hwa | 260/29.6 |
| 3,467,610 | 9/1969 | Fiarman et al. | 260/27 R |
| 3,728,418 | 4/1973 | Gleason | 260/27 R |
| 3,756,973 | 9/1973 | Stahl | 260/28.5 AV |
| 3,808,036 | 4/1974 | Zdanowski | 260/28.5 A |
| 3,835,078 | 9/1974 | Zdanowski | 260/27 R |
| 3,917,552 | 11/1975 | Bischoff et al. | 260/28.5 AV |
| 3,949,107 | 4/1976 | Schoenholz | 427/316 |
| 4,046,726 | 9/1977 | Weiner et al. | 260/28.5 A |

*Primary Examiner*—Melvyn I. Marquis
*Attorney, Agent, or Firm*—William A. Drucker

[57] ABSTRACT

A solid preparation from which a reconstituted emulsion bright-drying optionally rebuffable floor finish containing emulsion polymer, alkali-dispersible wax and optionally an alkali-soluble resin in dry particulate form which may be obtained by dehydration of an aqueous dispersion of the emulsion polymer, the wax and optionally the alkali-soluble resin at a temperature below the minimum film-forming temperature of the composition.

2 Claims, No Drawings

COATING COMPOSITIONS

This invention relates to coating compositions and methods of making them, more particularly to dehydrated compositions containing emulsion polymers that are reconstitutable to aqueous dispersions.

In the fields of decorative and protective coating, extensive use is made of aqueous polymers latices, produced by emulsion polymerisation, as major film-forming ingredient in both permanent and temporary organo-coatings including certain floor coatings.

Polymers and copolymers produced by emulsion polymerisation are known as "emulsion polymers".

Typical aqueous coating compositions contain many additional ingredients. Thus in the formulation of paints pigments, extenders, suspending agents, stabilisers, levelling agents, plasticisers and emulsifiers may be used; in cleaning compositions detergents including detergent salts and builders are used; and in emulsion polish compositions, such as are used for floor care waxes, there may be included, for example, alkali-soluble resins, surfactants, fugitive and non-fugitive plasticisers.

Frequently, polymer latex is manufactured at one site then transported to another where it is subsequently formulated into a coating composition. Quality control problems arise, often through environmental changes during the transportation of the latex. Moreover transportation costs are high and since polymer latices are frequently produced at a solids content level of up to 50%, frequently 10-25%, the net result is the expensive transportation of water. It has now been found that certain latices may be dehydrated for subsequent rehydration and recovery of useful dispersions.

Accordingly, in one aspect, the present invention comprises a method of at least partially dehydrating a composition containing a polymeric material latex at a temperature less than the minimum film forming temperature, hereinafter referred to as MFT, characteristic of the composition.

Preferably the composition containing the polymer latex is dehydrated to a solid, especially a particulate form. The invention may be employed for concentrating latices to reduce their water-content provided that the emulsion is not "broken", that is so that coagulation or coalescence does not occur during drying.

Dehydration may be effected by simple exposure of an aqueous composition containing polymer latex to drying conditions provided that the temperature does not rise above the MFT of the composition. If during dehydration the temperature of the latex or dehydrate is allowed to rise above the characteristic MFT, a sticky product can then result frequently presenting handling problems and difficulties may be experienced in redispersing the dehydrate. After total dehydration of a latex en masse a more or less hard cake or product results which may be broken up and powdered for redispersion. Whilst any suitable means of drying (such as air-drying, freeze-drying, oven-drying) may be employed it is preferred to employ the technique known as spray-drying.

Spray-drying has the advantage of relatively low cost (contrast freeze-drying) and speed. Moreover when properly adjusted the hot gas stream, used for drying, does not raise the temperature of droplets of latex or dehydrate particles to above the MFT. It seems that the presence of evaporating water moderates temperature increase until dehydration is complete, by which time the particles are translated away from exposure to relatively hot incoming air.

It is possible in certain apparatus to spray-dry whilst simultaneously coating onto an existing particulate solid material contained in a fluidised bed within the spray-drying apparatus. Using apparatus of this kind it is possible to apply polymeric materials onto solid substrates such as for example, alkaline materials exemplified by carbonate, bicarbonate, phosphate or silicate salts of ammonium, sodium or potassium, and the like. This method may be conveniently employed when for example, a particulate cleaning composition is to be prepared comprising one or more detergent salts and suitable polymeric materials. The intention with such compositions is to disperse the dry particles in water and apply the so-formed dispersion to a surface to be cleaned with an applicator. Cleaning occurs through the action of the detergent salts component, soil being removed in the applicator. Upon drying, a shine, due to the residual polymeric material coating the surface, remains after final air-drying.

In another aspect the present invention comprises dehydration products from emulsion compositions containing polymer latices as well as the reconstituted latices and compositions preparable therefrom.

The starting material for dehydration may be copolymer latices or formulated coating compositions containing such latices. Valuable dehydrates may be obtained with emulsion copolymers of lower $\alpha\beta$-ethylenically unsaturated monocarboxylic acids such as acrylic, methacrylic, crotonic and such acids as itaconic acid which are usually used in admixture and may be modified by incorporating other monomers or by blending with other polymers. The polymer latices are produced via emulsion polymerisation which may be conducted in a single step using a homogeneous blend of monomers, or in a polyphase polymerisation in which the polymerisation of a group of monomers is interrupted and a further group of monomers is added and polymerised and so on, resulting in either a "blend" of polymeric types of a "core" polymer depending on the precise conditions of reaction as is well known. It is not essential that the carboxyl groups be located externally of the individual polymer particles, for example, in the case of "core" polymers.

Preferred polymeric materials have a relatively high carboxyl content, that is free - COOH groups, or such groups neutralised by salt formation. Preferably the carboxylated copolymers contain at least 6% w/w of acid based on monomer mix. So far it has not been practicable to produce an emulsion polymer via emulsion polymerisation that contains more than about 35% w/w acid.

It has been found that low acid-content copolymers lead to dehydrates that redisperse unsatisfactorily. At an acid-content level of about 3% some redispersion occurs but insufficient for convenience.

Broadly speaking the acid value of polymers and copolymers suitable for use in the present invention will lie in the range 30 to 230 preferably 39 to 228 which ranges respectively approximately correspond with an acid content, expressed as acrylic acid, of 3.8 to 29.5% w/w and 5.0 to 29.2% w/w.

Other monomers that may be copolymerised with the $\alpha\beta$-ethylenically unsaturated monocarboxylic acids are typically:- styrene; substituted styrenes such as $\alpha$-methyl styrene and halogenated styrenes; lower alkyl methacrylate esters and/or acrylonitrile which modify the final copolymer by increasing its hardness; higher alkyl acrylates from alcohols containing up to 12 carbon atoms in straight or branched chains and cyclic alcohols; alkyl methacrylates from alcohols containing up to 12 carbon atoms notably butyl- and 2-ethylhexyl methacrylate which act by way of internal plasticisers modifying the hardness and filmforming properties of the final copolymer: hydroxylates; acrylamides for example methylol acrylamide; epoxidated monomers such as glycidyl acrylate and -methacrylate; aminoalcohol acrylate such as dimethylaminoethanol acrylate; divinyl benzene. These comonomers may be added singly or in combination at levels often less than 0.1 w/w of total monomer mix up to about 15% w/w impart special properties to the final copolymer, for example to improve intercoat adhesion, adhesion to substrates: self gloss, durability, detergent resistance and resistance to rubber heel marking.

Conveniently the carboxylated copolymer is "metallised" that is the latex includes a polyvalent metal salt in solution which is believed to cause "reversible" cross-linking between polymer molecules upon drying out of the latex. By "reversible" is meant that under certain conditions cross-linking occurs, for example upon a film drying out, but by changing the pH conditions, for example by addition of an aqueous base, such as ammonia and aliphatic amines or their salts, to or on an applied dried coating the cross-linkages may be broken. Only in the cross-linked condition is the polymer insensitive to water and detergent. Such metallised latices are well known especially in the field of floor maintenance where the latices are utilised in floor coating compositions for their water- and detergent- resistance coupled with ease of removal when desired. Suitable metal ions derive from magnesium, calcium, strontium, chromium, maganese, iron, cobalt, nickel, copper, zinc, zirconium and tin, preferably zinc.

To achieve a good dehydrate it is important that the MFT of the composition containing the emulsion polymer and other components, for example, wax be above ambient temperature, that is greater than 15° C. and preferably in the range of 20° C. to 80° C.

Good dehydrates are achieved when the MFT of the copolymer included in a coating composition is greater than 15° C. and preferably in the range of 20° to 80° C.

An important factor influencing MFT and solubility, hence redispersibility, of polymeric materials, apart from the selection of the precise chemical profile for monomers in a copolymer, is molecular weight. To some extent molecular weight may be controlled during polymerisation by the use of chain transfer agents, such as the halogenated hydrocarbons like carbon tetrachloride and carbon tetrabromide, and mercaptans such as 'tert' -dodecyl mercaptan. Mean molecular weight values may be estimated from viscosity characteristics measured with the Ostwald viscometer using standardised solutions of polymeric material in organic solvents for comparison.

The present invention has been found to be applicable to the dehydration of latices containing both high and low molecular weight polymers and copolymers. Redispersion is favoured with polymers of relatively low molecular weight. Those versed in the art of formulating floor polishes will appreciate that an alkali-soluble resin component, needed to optimise gloss and levelling, may be exemplified by a copolymer prepared from some of the abovementioned monomers. In which case the molecular weight is necessarily low to achieve the desired solubility in alkali.

In greater detail emulsion floor polish compositions, which may be pigmented or unpigmented, have solids content of about 8% minimum and typically contain one or more of the following component types:
(i) metallised copolymer emulsion,
(ii) non-fugitive plasticiser,
(iii) coalescent solvents or fugitive plasticiser,
(iv) surface active agents,
(v) water-dispersed wax,
(vi) dissolved alkali-soluble resin.

The invention also relates to the preparation of coating compositions from dehydrated compositions containing emulsion polymers, especially metallised emulsion polymers by dispersing dehydrate in water containing a suitable base and optionally plasticiser ingredient. Dehydrated compositions containing polymeric materials and any or all of the above component types save coalescent solvent may be prepared by redispersing dehydrate in water containing a suitable base and where desired, a plasticiser ingredient. the polymeric material has acid content greater than 6% w/w preferably greater than 10% and especially 20–25% w/w based on total weight of monomer mixture used to form the emulsion polymer in the dehydrate composition. Preferably the polymer is "metallised" for this enhances redispersion as an emulsion.

To prepare a dehydrate which is capable of protracted storage from a polish formulation it is important that the coalescent solvent, examples of which are diethyleneglycol monomethylether or monoethyl ether and fugitive plasticisers be omitted. Still retaining these two conponent types, a product can be achieved with adequate coating properties for some purposes upon reconstitution, for example, by use of a powder form of coalescent solvent or coalescent aid such as caprolactam; difficulty may be experienced in reconstituting becuse of the sticky nature occurring or developing in such dehydrate after standing some time.

Reconstituted emulsion polish compositions completely lacking coalescent solvent may be employed for renovating purposes upon a previously coated floor. In such application the formulation needs to be such that the MFT of the composition as a whole is exceeded during a final buffing step which usually attains a minimum of 28° C. on the floor, after application and during drying in situ. It is stressed that in these circumstances no coalescent solvent is necessary.

Such a composition has the advantage that if sprayed onto furniture or drapes and/or carpet, the composition dries to a powder which may be simply dusted off or brushed off as any other dusty material. In use the process, which is variously known as "spray-buffing", "spray-polishing" or "speed-polishing", involves applying, as by spraying, a wet coating onto a floor and before the coating has dried, buffing with a high-speed polishing machine to provide a finish which is a dry, hard, glossy surface often with a mirror-like appearance. The process obviates frequent stripping of the substrate and polishing brushes do not soil rapidly with a composition containing no coalescent solvent.

Essentially, the compositions designed for such a purpose actually contain insufficient plasticiser and/or coalescent solvent to render the composition, as a whole, film-forming at the relatively low temperatures experienced at floor level. Whilst there is a requirement for a minimum concentration of plasticiser, the coalescent solvent component need not be present in such conpositions.

Any or all of the remaining components may be included although wax concentration is generally at below 20% and preferably less than 15% by weight of total composition. Reconstitution is effected by dispersing, through stirring, an appropriate amount of the dehydrate in powder form into water containing fugitive plasticisers and/or coalescent solvents if needed together with a basic material. Suitable bases are, for example, ammonium hydroxide, ammonium carbonate, morpholine, diisopropylamine, 3-methoxy-propylamine, 2-amino-2-methyl-propan-1-ol, ethylene diamine and the like customarily used in emulsion polishes.

A particularly useful range of bases are the so-called carbonates or carbamates of organic amines. These are the material forming a crust that sometimes surrounds the stopper of bottles containing amines in storage places.

Such materials may be prepared by interacting free amine and carbon dioxide for example in solid form.

The amine carbonates or carbamates being solids may be mixed as such into dehydrated polish composition for transportation so that reconstitution does not necessitate separate addition of base.

The rate of redispersion depends upon the temperature of the mixing, paticle size of the dehydrate and the desired concentration, that is solids content, of the final dispersion.

The following are some non-limitative examples which save for Examples 1, 2 and 3 further illustrate the invention; Examples 1, 2 and 3 serve to illustrate the method of carrying out some aspects of the invention and the preparation of some starting materials.

EXAMPLE 1

36% solids content copolymer latices A, B, C and D were prepared in conventional apparatus by emulsion polymerisation at atmospheric pressure. 2.8% w/w dodecylated oxydibenzene disulphonate sodium salt was used as anionic surfactant and 1% w/w ammonium persulphate was used as free radical initiator. The compositions of A, B, C and D are shown in Table 1

Table 1

| Polymer | Compositions of monomer mix Parts w/w per 100 parts mixture | | | | | Percentage w/w on total monomer | MFT° C. of metallised polymer |
|---------|------|------|------|------|------|--------|------|
|         | MAA  | MMA  | BA   | STY  | GM   | TDM    |      |
| A       | 12   | 39   | 29   | 20   | —    | 0.75   | 59   |
| B       | 12   | 59   | 29   | —    | —    | 1.75   | 50   |
| C       | 12   | 58   | 29   | —    | 1    | 1.75   | 49   |
| D       | 12   | 48   | 40   | —    | —    | 1.50   | 43   |

Legend:
MAA = Methacrylic acid
MMA = Methyl methacrylate
BA = Butyl acrylate
STY = Styrene
GM = Glycidyl methacrylate
TDM = 'ert'-dodecyl mercaptan, a chain transfer agent for control of molecular weight The dispersions of emulsion polymers A, B, C and D were obtained as acidic bluish white, mobile fluids, containing less than 0.2 w/w unreacted monomer.

Each of the emulsion polymers was "metallised" by mixing with 25.170 parts zinc ammonium acetate solution per 100 parts dispersion. The zinc ammonium acetate solution was prepared by mixing 2.101 parts zinc acetate dihydrate, 2.166 parts aqueous ammonium hydroxide (S.G. 0.880), 0.614 parts nonyl phenyl polyethoxyethanol in 15.299 parts water. This provides for roughly 50% of the free carboxyl group to be "metallised" or cross-linked.

Finally the dispersions were adjusted to 30% solids content and pH 7.8-8.8. No separation of phases was observed on centrifuging at 4000 r.p.m. for 10 minutes.

The emulsion polymer dispersions so produced were air-dried on shallow trays at a temperature of below the MFT of the metallised emulsion polymer. Virtually odourless, hard cakes were produced and on crushing to pass a 100 mesh (BS410) sieve became white powders.

The dried products when stirred with water alone do not disperse or emulsify, illustrated by the fact that two phases are readily separable. Raising the pH of the mixtures to above 7.8 by addition of ammonium hydroxide solution results in bluish white dispersions exhibiting no separation on centrifuging at 4000 r.p.m. for 10 minutes.

EXAMPLE 2

The emulsion polymer dispersions prepared in Example 1 were introduced into a NIRO ATOMISER spray drying unit supplied by the Niro Company of Denmark operating under the following conditions.

Air (inlet) temperture 200° C.
Air (outlet) temperature 70° C.
Atomiser speed 60,000 r.p.m.

By this method extremely fine particle size powders were produced estimated at between 1 and 8 microns mean particle size.

The products when stirred with water alone do not disperse or emulsify, illustrated by the fact that the two phases are readily separable. Raising the pH of the mixtures to 7.8 by addition of ammonium hydroxide solution results in bluish white dispersions exhibiting no separation on centrifuging at 4000 r.p.m. for 10 minutes.

EXAMPLE 3

A coating composition was prepared using the dried emulsion polymer A from Example 1. 78.79 parts water, 4 parts diethylene glycol monomethyl ether and 0.5 parts of 0.880 ammonium hydroxide were stirred while adding 13.13 parts of the powder over 20 minutes. After stirring for a further 10 minutes period 0.79 dibutyl phthalate and 0.79 parts tributoxyethyl phosphate were added. Stirring was continued until complete redispersion of the ingredients was obtained. This could be detected by examination of the dispersion on a black Test card for signs of bittiness and also by centrifuging a small portion at 4000 r.p.m. for 10 minutes. After stirring the dispersion for a total of one hour no signs of bittiness or separation after centrifuging was noted.

The dispersion when coated onto a test card dried to a glossy, water resistant, flexible polymeric coating.

EXAMPLE 4

A dispersion of an intermediate molecular weight oxidised polyethylene wax was prepared by the following procedure:

Using a pressure emulsification vessel at 150° C. a mixture of 19.455 parts polyethylene wax AC 392, (Trademark of Allied Chemical Corporation), 4.864 parts Lissapol NXP, a synthetic nonionic detergent marketed by Imperial Chemical Industries Limited and described as a nonylphenolethene oxide condensate (or Synperonic NP10 - another Trademark of Imperial Chemical Industries Limited for "Lissapol NXP") 0.468 parts potassium hydroxide, 0.195 parts sodium metabisulphite and 46.429 parts softened water was stirred for one hour. The emulsion was cooled to give a stable dispersion of total-solids content pf 35%.

This dispersion was mixed with metallised polymer B shown in Table 1 in the following ratio:

Polymer dispersion 139.9
Wax dispersion 22.5

The polymer/wax dispersion had a solids content of 30.69%, pH 7.8 and MFT 44° C.

The dispersion was spray dried using the conditions described in Example 2 to give a fine, white powder.

Using the method described in Example 3 the powder was redispersed to give a fine particle size, stable emulsion.

A 2.0 thousands of an inch wet thickness film was cast on to a glass panel to give a clear, tough, water-resistant film on drying. The presence of the wax component improved the scratch resistance of the coating film.

EXAMPLE 5

A dispersion of low molecular weight oxidised polyethylene wax was prepared by the following procedure:

Using a pressure emulsification vessel at 140° C. a mixture of 19.455 parts polyethylene wax AC 540, (a Trademark of Allied Chemical Corporation), an emulsifiable ehtylene copolymer 4.864 parts Lissapol NXP, (or Sunperonic NP10, A Trademark of Imperial Chemical Industries Limited), 0.486 parts potassium hydroxide, 0.195 parts sodium metabisulphite and 46.429 parts softened water was stirred for one hour. The emulsion was cooled to give a stable dispersion of total solids content of 35%.

The dispersion was formulated into a coating composition using the following recipe:

Metallised Polymer dispersion (B, Table 1): 188.5 parts
AC 540 wax dispersion: 30.3 parts
Tributoxyethyl Phosphate: 4.6 parts
Fluorocarbon Surfactant: 0.035 parts The dispersion was then spray dried on a NIRO Atomiser unit fitted with an Air Broom assembly. The inlet temperature was 185° C. and the outlet temperature 70° C. A fine white powder was collected.

Separate portions of the powder were mixed with the following alkaline substances
(i) Ammonium hydroxide (SG 0.880)
(ii) Ethylene diamine
(iii) Ammonium carbonate and dispersed by stirring into water to give a final total solids content of 10% by weight and a final pH of 8.3–9.2. The dispersions showed no separation after centrifuging for 10 minutes at 4000 r.p.m.

The emulsions were used for the routine maintenance of previously trafficked floor substrates such as vinyl, linoleum, vinyl asbestos and sealed wood by the process known as "Spray Cleaning". In this process a film of the emulsion is sprayed on the floor and then immediately burnished to a shine using a floor polishing machine.

EXAMPLE 6

Two alkali-soluble resin solutions were prepared as follows:

(a) Heat and stir at 55° C. a mixture of 2.35 parts ammonium hydroxide solution (SG 0.88) and softened water (80.3 parts) in a vessel. Add 15 parts modified styrene maleic anhydride resin (SMA 17352A - A Trademark of Atlantic Richfield Corporation) over 15 mins and then further 2.35 parts ammonium hydroxide solution. A clear solution of 15% solids is obtained after cooling.

(b) Heat and stir at 80° C. a mixture of 2.75 parts ammonium hydroxide solution (SG 0.88) and 72.5 parts softened water in a vessel. Add 22 parts of a rosin based resin SR88, a Trade Mark of Schenectady, over 15 minutes and then a further 2.75 parts ammonium hydroxide. A clear solution of 22% solids is obtained after cooling.

Using these resin solutions a series of dispersions utilizing the wax and metallised polymer dispersion previously described were prepared by mixing. The compositions are shown in Table 2.

Two series of powders were prepared by (1) drying the dispersions on trays below their MFT's and (2) by spray drying the dispersions in a NIRO spray drying unit (supplied by the Niro Company of Denmark).

The theoretical composition of the powders excluding the excess of zinc salt emulsifiers present in the metallised polymer and wax dispersion is:

zinc metallised polymer: 82.686%
Polyethylene wax: 12.937%
alkali-soluble resin: 4.311%
flourocarbon surfactant: 0.066%

The powders were redispersed in alkaline medium to a level of 15% total solids using the following formulation:

| Powder | 14 | parts by weight |
|---|---|---|
| Dipropylene glycol monomethyl ether | 2.132 | parts by weight |
| Diethylene glycol monomethyl ether | 2.132 | parts by weight |
| Diethylene glycol monomethyl ether | 2.132 | parts by weight |
| Dibutyl phthalate | 0.842 | parts by weight |
| Tributoxyethyl phosphate | 0.842 | parts by weight |
| Ethylene diamine | 0.800 | parts by weight |
| Softened water | 83.812 | parts by weight |
| TOTAL | 104.560 | |

The method of dispersion conprised stirring at 50° C. a mixture of the water, ethylene diamine, dipropylene glycol monomethyl ether, diethylene glycol monomethyl ether and then adding over 45minutes the powder. After stirring for a further 30 minutes and then cooling a stable dispersion was obtained. This showed no separation on centrifuging.

The coatings were applied in the normal manner to flooring substrates such as vinyl and vinyl asbestos tiles and assessed for gloss, levelling, recoatability and scrub resistance. In comparing the above composition with commercially available floor polishes excellent results were obtained. Also as expected with metallised floor polishes, the films were readily removed by dilute alkaline detergents.

ling, as compared with a self-stripping polish currently available on the market, were observed.

Table 2

| | PARTS BY WEIGHT | | | | |
|---|---|---|---|---|---|
| METALLISED POLYMER DISPERSION at 30% SOLIDS | 1 | 2 | 3 | 4 | 5 |
| A | 139.94 | | | | |
| B | | 139.94 | 139.94 | | |
| C | | | | 139.94 | |
| D | | | | | 139.94 |
| POLYETHYLENE WAX DISPERSIONS at 35% SOLIDS | | | | | |
| AC 392 (Example 4) | 22.52 | 22.52 | 22.52 | 11.26 | 22.52 |
| AC 540 (Example 5) | | | | 11.26 | |
| ALKALI SOLUBLE RESIN | | | | | |
| STYRENE-MALEIC ANHYDRIDE TYPE at 15% SOLIDS | 17.51 | | 17.51 | 17.51 | 17.51 |
| Rosin-based resin at 22% SOLIDS | | 11.92 | | | |
| FLUOROCARBON SURFACTANT FC 128 1% SOLIDS AQUEOUS SOLUTION | 4.00 | 4.00 | 4.00 | 4.00 | 4.00 |
| TOTAL | 183.97 | 178.4 | 183.97 | 183.97 | 183.97 |
| TOTAL SOLIDS | 28.55% | 29.44% | 28.55% | 28.77% | 28.77% |
| MFT° C. | 49° C. | 49° C. | 44° C. | 47° C. | 35° C. |

EXAMPLE 7

A 36% solids metallised emulsion polymer was prepared by addition at room temperature of 3.846 parts zinc acetate dihydrate, 5.615 parts ammonium hydroxide (0.880) and 3.963 parts 20% Ethylan HA (a Trademark of Lankro Chemicals Limited, a synthetic detergent described as nonyl phenol - 35 : mol - ethoxylate) in 13.77 parts water to 100 parts of a dispersion of 44% solids core polymer produced by split phase emulsion polymerisation at 75° C. of a monomer mix consisting of 22% methacrylic acid, 29% butyl acrylate and 49% methyl methacrylate using tert-dodecyl mercaptan as chain transfer agent.

A polymer emulsion concentrate of constitution 89.63% of the above dispersion, 6.59% polyethylene wax emulsion (25% solids), 1.72% levelling aid (1% active FC128- a Trademark of Minnesota Mining and Manufacturing Company, a fluorochemical surfactant and 2.06% tributoxyethyl phosphate plasticiser was air-fried as a thin film at ambient temperature and powdered in a ball mill.

The dehydrate produced was intimately mixed with ammonium carbonate in weight ratio 85 : 15. The product was redispersed in cold tap water to give a final dispersion of 16% solids content.

On coating out this product, a non-buffable, dry-bright polish, an excellent finish was obtained after drying. Although no levelling resin was included, gloss and levelling were the same as that obtained with a commerically available liquid dry-bright polish but had a slightly longer drying time.

EXAMPLE 8

In place of the ammonium carbonate used in Example 7, 2-amino-2-methylpropan-1-ol carbonate/carbamate was mixed with the dehydrate produced in Example 7 in the ratio 87 dehydrate to 13 parts base.

The mixture was dispersed in cold tap water to provide a 16% solids dispersion of uniform consistency. On coating out, a dry film with excellent gloss and levelling characterisitics was produced. After traffic and reapplication of a fresh coating self-stripping properties were exhibited. In some tests superior gloss and level-

EXAMPLE 9

To 89g 2-amino-2-methylpropan-1-ol dissolved in 600g 1.1.1-trichlorethane was added 22g solid carbon dioxide with stirring. The temperature of the mixture rose to 45° C. and a white precipitate formed which was separated by filtration, suspended in 300 ml 40°-60° C. petroleum spirit, filtered and dried under vacuum at ambient temperature. The white, crystalline product obtained was the carbonate/carbamate salt.

Using the same technique analogous salts with morpholine, diisopropylamine and 3-methoxypropylamine were prepared.

EXAMPLE 10

A 36% solids metallised emulsion polymer was prepared by addition at room temperature of 2.463 parts zinc acetate dyhydrate, 2.552 parts ammonium hydroxide (0.880) and 4.575 parts 20% Sapogenate T500, a synthetic detergent described as a tributyl phenol polyglycol ether (a Trademark of Fabwerke Hoechst A.G.) in 12.338 parts water to 78,072 parts of a dispersion of a 44% solids core polymer produced by split phase emulsion polymerisation at 75° C. Of a monomer mix consisting of 12% methacrylic acid, 29% butyl acrylate and 59% methyl methacrylate using 'tert' dodecyl mercaptan as chain transfer agent.

A polymer emulsion concentrate of constitution 71.99% of the above dispersion, 24.29% polyethylene wax emulsion (20% solids), 2.1% tributoxyethyl phosphate and 1.62% fluorocarbon levelling aid, FC128 (a Trademark of Minnesota Mining and Manufacturing Company) (1½ active) was prepared by cold blending. The blend was spray dried in a Niro atomiser spray drying unit (supplied by the Niro Company of Denmark), fitted with an air broom assembly, at air inlet temperture of 180° C.

The dried product was dispersed in aqueous ammonia to give 10% solids dispersion of pH9.

A wet, sprayed-on coating on a clear test surface was burnished with a high speed polishing machine to produce a durable finish with high sheen. This shows that at reduced plasticiser level a useful finish can be prepared by this method of the invention. Dried-on spots spray were simply dusted off hard surfaces and could be shaken out of drapes. The level of plasticiser may be still further reduced if the polymer used has a higher concentration of methacrylic acid in the monomer mix then the 12% used in this example. High methacrylic acid content is believed to improve the self-levelling characteristics of the final polymer and hence compositions containing it. Thus, in the range 15% – 25% methacrylic acid content, no plasticiser is necessary for spray polishing application; from 5 – 15% methacrylic acid content the necessary concentration diminishes with increased acid concentration.

The application of the present invention to the production of reconstitutable wax-containing emulsion floor polishes is of great advantages because the dehydrated product is not sensitive to moisture during shipment being reconstitutable only in alkaline medium. Since only coalescent solvent and the base components are omitted there is potential saving on special facilities at remote sites otherwise needed to incorporate some components, for example plant for production of wax-dispersion and the like.

Utilizing solid bases such as ammonium carbonate or amine carbonate/carbamates it is possible to prepare dry powders by mixing dehydrated coating compositions lacking base with such solid bases for packaging in moisture-proof containers. With such dry compositions the user may simply mix with water, especially in the case of compositions for use in the "spray-buffing" process.

What is claimed is:

1. A solid composition for addition, with sufficient alkaline reacting compound, to an aqueous medium to afford a uniform aqueous dispersion of pH greater than 7, said composition obtained from spray drying the following composition:
   alakli dispersion polyethlene wax emulsion;
   at least one surfactant; and
   acrylic copolymer emulsion, containing 3.8% to 29.5% by weight of monomer of monocarboxylic acid expressed as acrylic acid.

2. In a composition for use in polishing floors, furniture and the like, the improvement comprising:
   (a) 3.8% to 29.5% by weight of a polymer mixture of monocarboxylic acid and at least one alkyl ester of such acid, expressed as acrylic acid, and metallized with at least one polyvalent metal ion selected from the group consisting of magnesium, calcium, strontium, chromium, manganese, iron, cobalt, nickle, copper, zinc, zirconium, cadmium and tin;
   (b) at least one alakli dispersible polyethylene wax;
   (c) at least one surfactant;
   (d) at least one alkaline reacting compound; and
   (e) water.

* * * * *